United States Patent

[11] 3,577,700

| [72] | Inventors | Walter Bippus<br>Bensheim;<br>Horst Ackermann, Wiesbaden, Germany |
|---|---|---|
| [21] | Appl. No. | 878,282 |
| [22] | Filed | Nov. 20, 1969 |
| [45] | Patented | May 4, 1971 |
| [73] | Assignee | Demag A.G.<br>Duisburg, Germany |
| [32] | Priority | Dec. 20, 1968 |
| [33] | | Germany |
| [31] | | P 18 15 983.6 |

[54] METHOD AND APPARATUS FOR PRODUCING CONTAINER PARTS FROM SHEET MATERIAL
7 Claims, 4 Drawing Figs.

[52] U.S. Cl. .................................................. 53/30,
18/35, 53/184, 53/389, 83/365
[51] Int. Cl. ...................................................... B65b 41/04,
B65b 47/10
[50] Field of Search ........................................ 53/30, 51,
66, 184, 389; 18/35; 83/365

[56] References Cited
UNITED STATES PATENTS
3,048,952  8/1962  Paal ............................. 53/184
3,232,024  2/1966  Brown ......................... 53/184
3,294,301  12/1966  Richter ....................... 53/51X Primary Examiner—Travis S. McGehee
Assistant Examiner—E. F. Desmond
Attorney—McGlew and Toren ABSTRACT: A method for the mechanical production of containers and container bottom parts includes the feeding out of a sheet of a material which is thermoplastically deformable and the indexing of the sheet past cutting, heating or molding, filling, covering and sealing apparatus to effect the deep drawing and filling and sealing of the container. The material is fed out and cut into a predetermined length from a web of such material and the individual cut portions are provided with raster holes by means by which the cut elements are centered in respect to the subsequent operations thereon. The apparatus for carrying out the method includes a conveyor having finger elements which are movable to engage in the raster holes of the individual cut elements and to move them to each additional working station and to center them at each station. The web material from which the molded containers are formed advantageously includes a printed distorted picture thereon for facilitating the centering and cutting thereon.

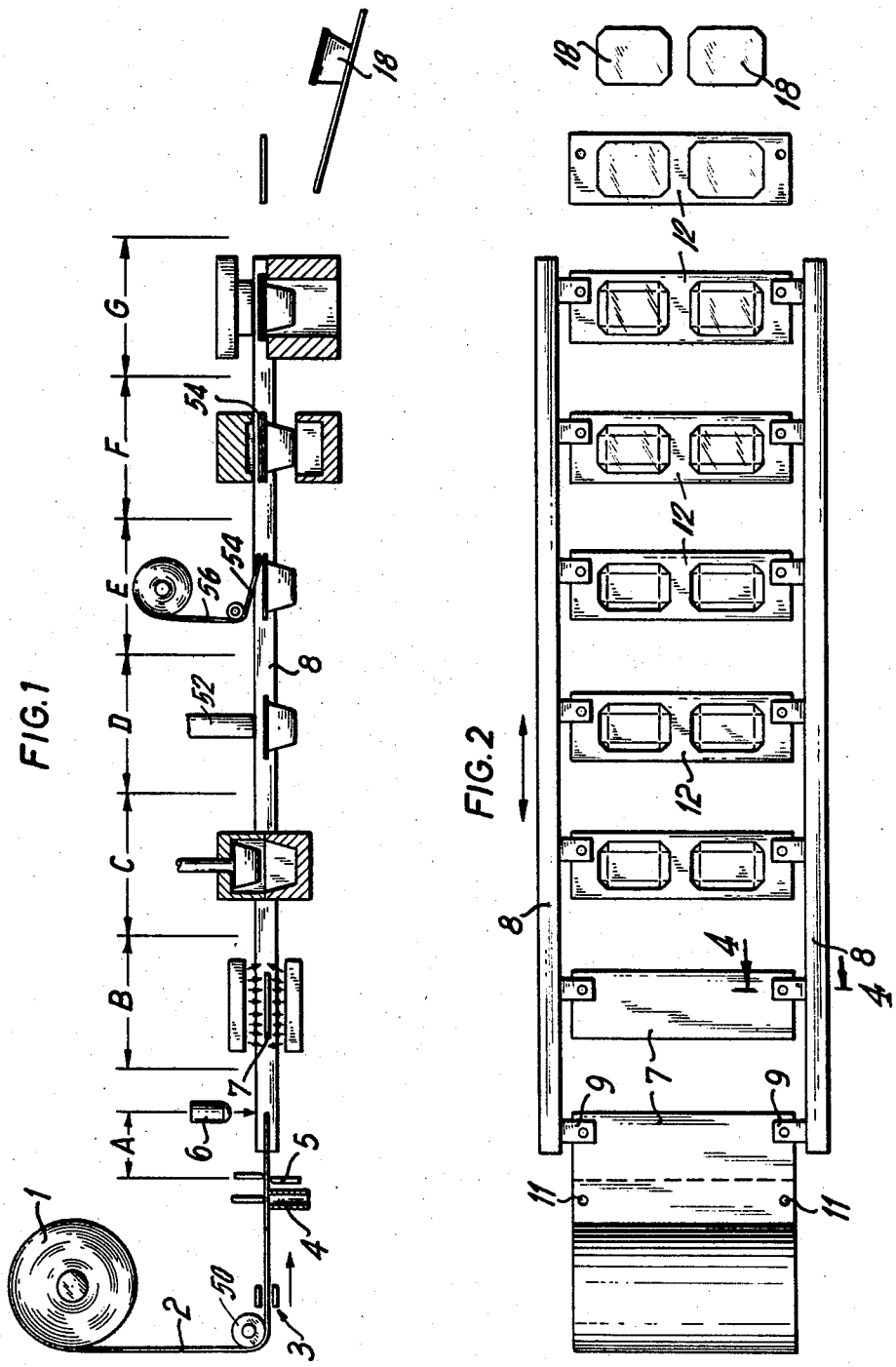

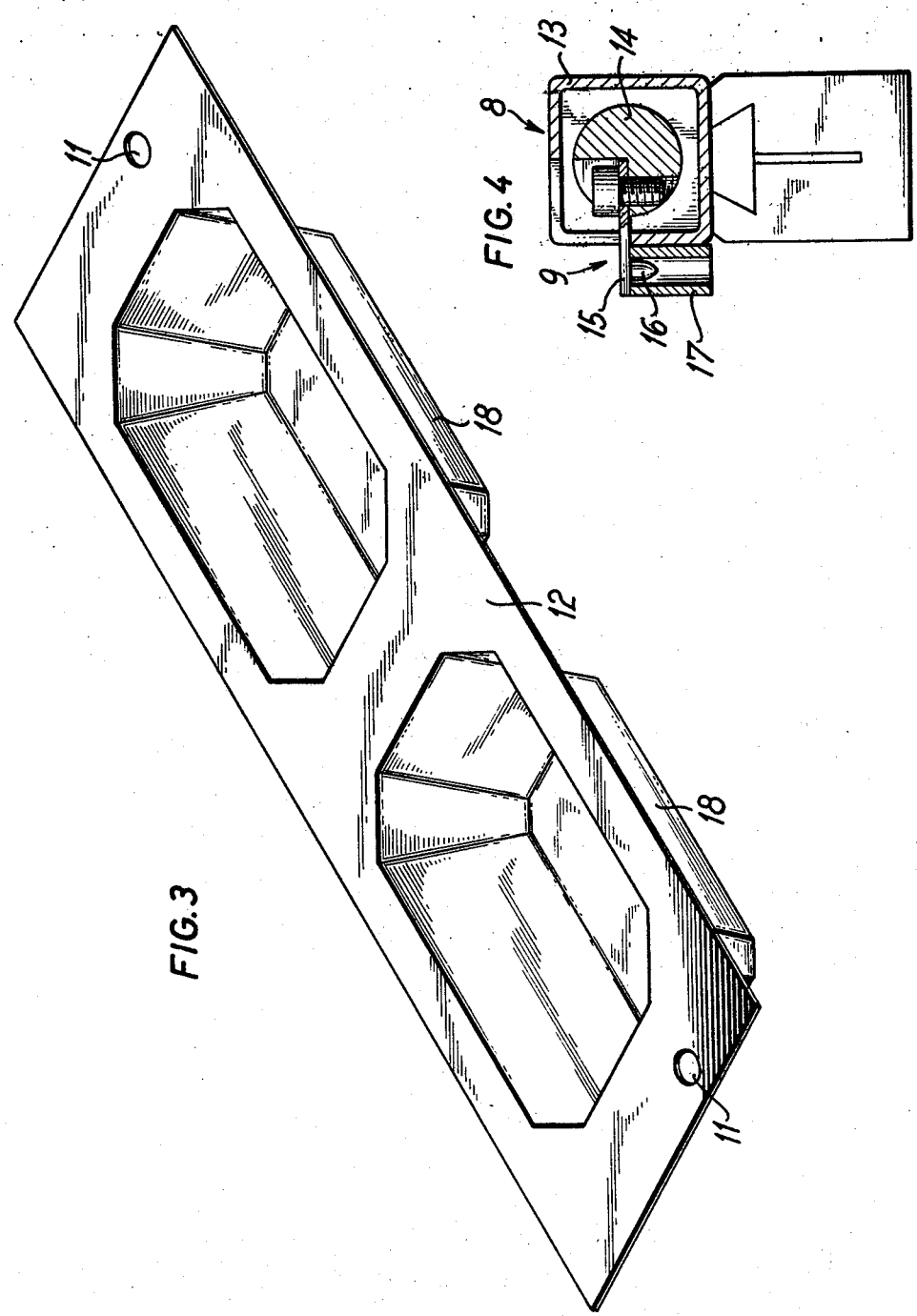

METHOD AND APPARATUS FOR PRODUCING CONTAINER PARTS FROM SHEET MATERIAL

SUMMARY OF THE INVENTION

This invention relates in general to a method and apparatus for producing containers and in particular, to a new and useful method and apparatus for the deep drawing of containers or container parts from a thermoplastically deformable sheet by indexing the sheet after it is cut into a predetermined length by conveyor means to a heating and molding station and one or more other operating stations.

It is known to deep-draw bottom parts of containers intermittently from a heated thermoplastically deformable sheet or web. The bottom parts which hang together in the band are filled during their further movement, closed with a cover and subsequently severed from the moving band as a finished packing. It is also known to draw the container bottom parts continuously into the sheet web by means of a revolving molding wheel and to effect the further processing intermittently on the closed band. A machine which molds the container bottom parts in a continuous sheet band and severs them immediately after the molding into palettes having one or more container bottom parts is known. Such a machine operates to sever the molding parts into palettes in order to prevent elongations which appear in the container web by different shrinkage or expansion of the sheet, depending upon the sheet employed and on the process conditions, and to prevent the sheet distortion from influencing the following operations at the various operating stations. Different shrinkage or expansion in the machine processing in a band form can have the result that the intervals of the working stations do not coincide with the packing intervals defined on the band or web. The sheet band of which the container bottom parts are made therefore cannot be provided with a controlled print for a favorable color design of the container bottom parts since the printed material, in the form of a distorted printing on the unmolded sheet, cannot assume a corresponding exact position with the known measures after the parts are drawn in the molding operation.

Accordingly, it is an object of the invention to provide a method, and an apparatus for carrying out the method, which makes it possible to take into account the position of the distorted printing on a continuous sheet or web of material which is to be formed into a container. The arrangement of the invention is designed to ensure that there will be an exact centering of the container forming elements of the sheet as it is fed into association with the cutter in a subsequent precise feeding of the parts into the station for the molding thereof. With the inventive arrangement the individual cutoff parts which are designed to be formed as palettes can be precisely indexed and centered in each subsequent working station for heating, molding, filling, covering, sealing and punching operations. In accordance with the invention the web material is cut at a station in which means, such as a photocell control, is provided for cutting at the location to give a precise cutoff length. In addition, means are also provided to insert holes into each sheet length to provide means for centering the individual cutoff elements as they are moved by conveyor means to various working stations and centered in each station. The individual sheets are cut from the web in lengths corresponding to the required position of the printed distortion picture formed on the continuous roll of material. The apparatus for carrying out the invention comprises a photocell for determining the feed length of the material to be cut and for ensuring that it is in a precise position for cutting the web or material in order to take into account the distortion picture thereon and to punch out raster holes so that conveyor means associated therewith will be able to engage in the holes and provide a precise indexing of the cut part through various subsequent operative stations.

With the method of the invention and the apparatus for carrying out this method it is possible to control the feeding movement for a sheet which is cut to a precise length for the molding of the container with the distorted printing thereon so as to form the container with the printing into a design configuration. The operation is such that the distorted picture is arranged on the sheet so that when it is molded the finished picture will be in a correct position. It is also possible to separate the individual cut lengths either before or after the molding station and to effect the control of the printing means of the photocell only at the molding station or shortly before it. The raster holes in the elements will serve as points of engagement for the feeding tongs or engaging fingers of the conveyor means, and these fingers center the cut sheet and the finished container parts in the subsequent working stations.

Accordingly, it is an object of the invention to provide a method of forming containers or container parts by the deep drawing of a thermoplastically deformable sheet printed with a distorted picture, comprising cutting the sheet into cuts of predetermined length and applying raster holes into the cut sheets, and moving the sheets by engagement in the raster holes to center the cut lengths in each subsequent working station for operations upon each cut length.

A further object of the invention is to provide an apparatus for carrying out the method of the invention which includes sensing means such as a photocell for determining the length of sheet material which has been fed out so that it can be cut into a desired length with the position of a distorted picture thereon being properly centered, punch a hole in the cut length at a predetermined precise location, and conveyor means engageable with the raster hole which has been punched out for engaging and effecting the step-wise movement of the cut length through various operating stations.

A further object of the invention is to provide an apparatus for forming containers which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment.

BRIEF DESCRIPTION OF THE DRAWINGS

In the drawings:

FIG. 1 is a schematic side elevational view of an apparatus for forming containers in accordance with the invention;

FIG. 2 is a top plan view of the means for feeding the cut lengths of sheet material into association with the various work stations of FIG. 1;

FIG. 3 is a top side perspective view of an individual palette with the container bottoms being formed therein; and FIG. 4 is a section taken along the line 4—4 of FIG. 2.

GENERAL DESCRIPTION OF THE PREFERRED EMBODIMENTS

Referring to the drawings and in particular, the invention embodied therein, comprises an apparatus for the deep-draw molding of containers or container bottoms from a continuous sheet or web 2 of a thermoplastic material which is fed off a reel 1 around guide roller 50 through a horizontal operating path. In accordance with the method of the invention the continuous sheet 2 having a distorted picture imprinted thereon is fed past control means 3 which includes a photocell 6 for sensing the end position of the sheet and for actuating severing means or a knife 5 to cut off a selected length of the sheet material and also to actuate punch means 4 for punching a raster hole 11 into each cutoff length 7 at a precise location in respect to the path of feed. Once the cut element or blank 7 is formed with the raster holes it may be properly aligned and fed into association with conveyor means 8 for indexing the cut element 7 at various working stations.

In accordance with the invention the conveyor means 8 is provided with raster hole engaging means in the form of a fingers or tongs generally designated 9 having a laterally extending arm or portion 15 and a bearing engaging element 16 which is adapted to move into the associated hole 11 on each side of the cutaway portion 7. As indicated in FIG. 4, each engaging finger 9 is formed in a hollow member 13 of the conveyor 8 and the arm 15 is affixed to a shaft 14 so that it may be rotated therewith through an arc of approximately 90° in order to permit positioning and removal of the bearing member 16 in the holes 11. The engagement means also include a tubular receiver member or counterpart 17 which is secured to one side of the hollow member 13 and provides a receiving recess for the bearing part 16 after it engages through the openings provided by the raster holes 11.

By means of the photocell 6 it is possible to control the length of the cuts 7 in the longitudinal and the transverse directions and reciprocating conveyor means 8 engages by the feeding fingers 9 into the raster hole openings to feed each cut 7 exactly to each successive working station. In addition to the cutting station A there is a heating station B, a deep-draw molding station C, a filling station D, a covering station E, a sealing station F and a punching station G.

The cut 7 is first heated at the station B and thereafter deep-drawn in the mold C and filled through a filling conduit 52 in the station D. A cover 54 is applied from a continuous strip of material 56 at the station E which includes suitable cutoff means (not shown) for severing the cover at the desired length. The cover 54 is then sealed in position on top of the double cutout containers in the form of a palette 12 as shown in FIG. 3. The punching out of the individual containers from the palette configuration of FIG. 3 is accomplished at the station G and the separated containers 56 are moved off from the feed path.

During each indexing operation the feeding conveyor means 8 engages by the fingers 9 to the raster holes 11 of each cut 7 by the rotation of the shaft 14. Thereafter the shaft 14 is moved forwardly to position the cut 7 or the palette 12 at the feeding stations indicated at FIG. 1 in timed succession. In the rhythm of the working cycle of the conveyor 8 the fingers 9 are closed to bring the bearing member 16 within the receiving member 17 when the fingers are engaged in the holes 11 of the cuts or palettes 12 and the shaft is moved in a forward direction toward the next working station. The fingers 9 are opened during the return movement of the shaft 14.

We claim:

1. A method for the mechanical production of containers, container bottom parts and similar parts by deep-drawing a thermoplastically deformable sheet which is printed particularly with a distorted picture, comprising feeding a continuous strip of the material into a first cutting station and cutting the material to a precise predetermined length and simultaneously imparting a raster hole at two spaced locations on the cutaway portion, and engaging the cutaway portion by engagement in the raster holes to move the cutaway portion to a next operating station and to center it in respect to the operating station.

2. A method, according to claim 1, wherein the sheet material is provided with a distorted picture imprint, and wherein the raster holes are located in accordance with the position of the printed distortion picture thereon.

3. A method, according to claim 1, wherein the cutaway sheet is centered at a heating station and heated, is thereafter moved in respect to a molding station where the containers are deep-drawn molded, is thereafter moved to a filling station where the container is filled, and is thereafter moved to a covering station where a cover is applied thereto.

4. A method, according to claim 3, wherein said cut portion is wide enough to provide two separate container formations at the molding station, and subsequent to applying a cover over the both of said container portions moving the covered container portions to a punching station for separating the containers from each other.

5. An apparatus for indexing a cut sheet of material through a molding process for the formation of containers and the like, comprising photocell control means, feed means for moving a continuous sheet of material into association with said photocell control means, cutting means connected to said control means for cutting a precise cut length away from the sheet of material and for simultaneously defining a raster hole at two spaced locations on the cutaway portion, a plurality of work stations for operating on the cutaway sheet material including a heating and molding station and conveyor means for engaging the cutaway portion and for indexing it through and centering it in said a plurality of work stations.

6. A device, according to claim 5, wherein said conveyor means includes a rotatable and axially displaceable shaft member, and a finger carried on said shaft member being rotatable therewith to position the finger to engage in a raster hole which is defined by the cutaway portion.

7. A device, according to claim 6, including a tubular receiver member carried by said conveyor and being positionable below the raster hole of each cutaway portion, said finger being movable through the hole to engage in said tubular receiver member to hold the sheet by said conveyor means for movement through the various work stations.